(No Model.)
N. D. HODGKINS.
HUB PROTECTOR FOR WAGONS.
No. 529,909. Patented Nov. 27, 1894.
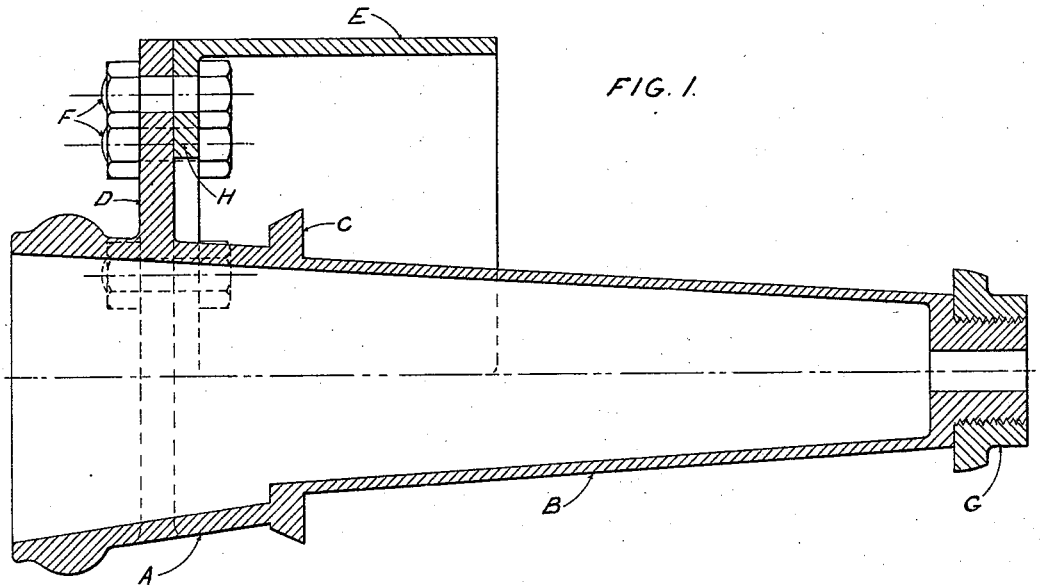
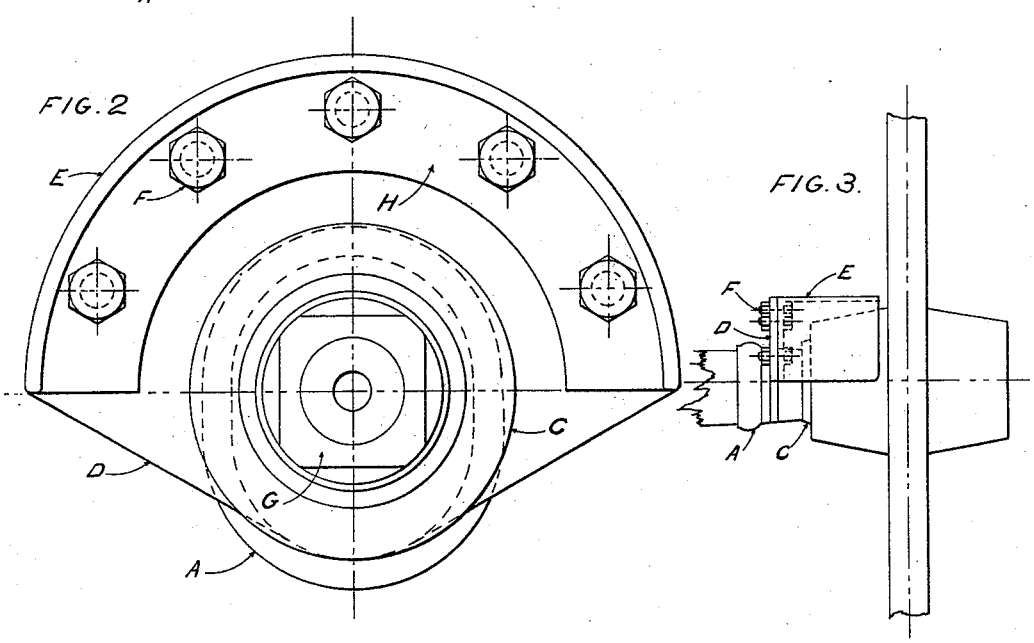
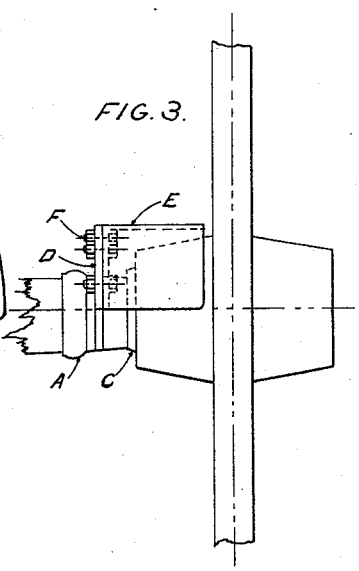
WITNESSES
Nelson D. Hodgkins
INVENTOR
Clark & Peare
ATTORNEYS.

UNITED STATES PATENT OFFICE.

NELSON D. HODGKINS, OF MARQUETTE, MICHIGAN, ASSIGNOR OF ONE-HALF TO FREDERICK O. CLARK, OF SAME PLACE.

HUB-PROTECTOR FOR WAGONS.

SPECIFICATION forming part of Letters Patent No. 529,909, dated November 27, 1894.

Application filed April 21, 1894. Serial No. 508,544. (No model.)

*To all whom it may concern:*

Be it known that I, NELSON D. HODGKINS, of Marquette, county of Marquette, and State of Michigan, have invented a new and novel device for constructing a united axle-skein and hub-protector, so as to prevent sand, gravel, and other dirt thrown upon the hub of a wheel upon a heavy double wagon or cart, and thence upon the axle of said wagon or cart, from working into the inside of the hub and grinding the stub of the axle when the wheel is in motion, of which the following is a specification.

My invention has for its object, first, the production of a mechanism which will cause the skein of an axle stub formed by fitting said skein upon wooden axles to last much longer in use, than when not so protected; second, a mechanism firmly attaching a shield for the protection of the hub from sand, gravel, and other dirt thrown upon the hub of the wheel, as above set forth, in a durable and efficient form, and at much less expense than it can be done by any other device within my knowledge; third, a mechanism that can be constructed and applied, as set forth, more durable, and at less cost than any other device, for the purpose named, within my knowledge.

In the drawings, Figure 1 shows the exterior of axle skein, as adjusted upon wooden axles, when in use, with hub protector attached. Fig. 2 is an end view of my device, as shown in Fig. 1, showing axle skein with hub protector adjusted thereon. Fig. 3 shows my device as adjusted on a wooden axle and in the hub of a wheel, with hub protector adjusted thereto.

B is an axle skein for use on a wooden axle for a heavy double wagon or cart, or other vehicle, which skein is provided with collar C, against which collar the hub rests when adjusted on the spindle.

A is the collar of the axle skein B, when adjusted for use. G is the nut that holds the wheel onto the axle spindle thus constructed.

D is a semi-circular lug cast solid to shoulder A of skein B. E is a circular shield, consisting of thin Russia iron or other suitable material, which shield is bolted to the outer side of said lug D and is bent in circular form to correspond with said lug D, making shoulder H, which shoulder H is held to said lug D by bolts F.

Shield E extends outward, so as to lap over the hub of the vehicle, nearly to the spokes and close to the hub, as shown by the diagram, leaving sufficient space between the shield E and the hub to prevent friction. Shield E is loose upon the hub, so as to have such spring as to adjust itself to the hub of the wheel, when in use, without friction.

It will be noticed, that said device is so constructed as to be strong and durable, and especially suitable for use upon heavy double wagons and carts and can be constructed at a very small cost, and is an improvement over and superior to any other device within my knowledge, for the purposes stated, and for use upon double wagons and heavy carts with skeins adjusted upon wooden axles, and this device will add greatly to the durability of the stub of an axle thus constructed.

What I claim is—

The combination of the skein B, provided with nut G, collar C and collar A, to which is cast semi-circular lug D, to which lug, shield E provided with shoulder H, is attached, by bolts F, as shown and described.

NELSON D. HODGKINS.

In presence of—
MARY L. RAYMOND,
WILLIAM J. O'MEARA.